US012680212B2

(12) United States Patent
Lee et al.

(10) Patent No.: US 12,680,212 B2

(45) Date of Patent: Jul. 14, 2026

(54) INTERFACE AND CLOTHING TREATMENT APPARATUS EQUIPPED WITH INTERFACE

(71) Applicant: LG Electronics Inc., Seoul (KR)

(72) Inventors: Hyunseung Lee, Seoul (KR); Kyuchul Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 245 days.

(21) Appl. No.: 18/575,160

(22) PCT Filed: Jun. 9, 2022

(86) PCT No.: PCT/KR2022/008152

§ 371 (c)(1),
(2) Date: Dec. 28, 2023

(87) PCT Pub. No.: WO2023/277378

PCT Pub. Date: Jan. 5, 2023

(65) Prior Publication Data

US 2024/0301607 A1 Sep. 12, 2024

(30) Foreign Application Priority Data

Jun. 28, 2021 (KR) ........................ 10-2021-0083902

(51) Int. Cl.
*H01H 19/14* (2006.01)
*D06F 34/30* (2020.01)
*D06F 34/34* (2020.01)

(52) U.S. Cl.
CPC .............. *D06F 34/30* (2020.02); *D06F 34/34* (2020.02); *H01H 19/14* (2013.01)

(58) Field of Classification Search
CPC ...... H01H 19/14; H01H 19/11; H01H 19/585; H01H 19/58; H01H 19/62; H01H 19/635;
(Continued)

(56) References Cited

U.S. PATENT DOCUMENTS

2017/0163437 A1 6/2017 Yang et al.
2020/0081554 A1* 3/2020 Eraslan ................. G06F 3/0338
2020/0253073 A1 8/2020 Cui et al.

FOREIGN PATENT DOCUMENTS

CN 112538723 A 3/2021
JP 2013-188334 9/2013
(Continued)

OTHER PUBLICATIONS

International Search Report and Written Opinion in Appln. No. PCT/KR2022/008152, mailed on Oct. 6, 2022, 20 pages (with English translation).
(Continued)

*Primary Examiner* — Ahmed M Saeed
(74) *Attorney, Agent, or Firm* — Fish & Richardson P.C.

(57) ABSTRACT

An interface includes an encoder having a fixed part, a rotating part rotatably coupled to the fixed part, and a signal generating part generating an electrical signal when the rotating part rotates; an actuator having a shaft fixed to the rotating part, a handle fixed to the shaft, and a receiving space formed inside the handle; a display part having a fastening body fixed to the fixed part through the shaft, a receiving body fixed to the fastening body and positioned inside the receiving space, a mounting space formed inside the receiving body, a fastening body through-hole communicating with the mounting space through the fastening body, a display fixed to the mounting space and displaying information, a cover fixed to the receiving body, and a wire inserted into the fastening body through-hole to transmit power or a signal to the display; and a sealing part.

16 Claims, 13 Drawing Sheets

(58) Field of Classification Search
CPC ...... H01H 19/64; H01H 19/63; H01H 19/005; H01H 19/10; H01H 1/2041; H01H 19/56; H01H 19/03; H01H 19/02; H01H 2019/006; H01H 19/00; H01H 19/20; H01H 19/001; H01H 21/50; H01H 2221/01; H01H 19/025; H01H 19/06; D06F 34/30; D06F 34/34; D06F 34/32; D06F 37/261; D06F 34/05; D06F 34/08; G06F 1/169; G06F 3/0362
See application file for complete search history.

(56) References Cited

FOREIGN PATENT DOCUMENTS

| | | |
|---|---|---|
| KR | 10-2013-0026061 | 3/2013 |
| KR | 10-2016-0010093 | 1/2016 |
| KR | 20-2019-0000990 | 4/2019 |
| WO | WO 2021/000300 | 1/2021 |

OTHER PUBLICATIONS

Office Action in Korean Appln. No. 10-2021-0083902, mailed on Apr. 25, 2024, 12 pages (with English translation).
Extended European Search Report in European Appln. No. 22833434.8, mailed on May 22, 2025, 9 pages.

* cited by examiner

INTERFACE AND CLOTHING TREATMENT APPARATUS EQUIPPED WITH INTERFACE

CROSS-REFERENCE TO RELATED APPLICATIONS

This application is a National Stage application under 35 U.S.C. § 371 of International Application No. PCT/KR2022/008152, filed on Jun. 9, 2022, which claims the benefit of Korean Application No. 10-2021-0083902, filed on Jun. 28, 2021. The disclosures of the prior applications are incorporated by reference in their entirety.

TECHNICAL FIELD

The present disclosure relates to an interface and a laundry treatment apparatus including the interface.

BACKGROUND

An electronic device including a laundry treatment apparatus for laundry of clothing (commonly known as a laundry object or drying object), drying of clothing, and laundry and drying of clothing requires an input and output device (interface) for a user to input a control command to the electronic device.

Among existing interfaces, a display for displaying a control command to be selected by a user, a search unit for searching for the control command displayed on the display, a selection unit for allowing the user to select the control command displayed on the display, and an input unit for requesting execution of the control command selected by the user are designed to be positioned in separated spaces (Korean Publication No. 10-2014-0023986).

That is, with regard to the existing interface, a display (LCD or LED panel) for displaying a control command, a knob button for searching for a control command to be executed by a corresponding electronic device by displaying the control command on the display, a button for selecting the control command displayed on the display, a button for inputting a control command for requesting execution of the selected control command are arranged in separate spaces, respectively, and such arrangement is a factor that determines a design (design of a control panel) of an interface positioned on a front surface of an electronic device such as a laundry treatment apparatus.

With regard to the existing interface with the aforementioned configuration, devices including a display are distributed in a width direction of an electronic device or distributed in a height direction of the electronic device, and thus there is a need for many spaces to install the interface.

DETAILED DESCRIPTION

Technical Solution

An object of the present disclosure is to provide an interface obtained by integrating display of a control command, search or change of the displayed control command, and selection of the displayed control command into one device, and a laundry treatment apparatus including the interface.

An object of the present disclosure is to provide an interface for minimizing a space required for installation, and a laundry treatment apparatus including the interface.

An object of the present disclosure is to provide an interface for minimizing the possibility of flowing of water or foreign substances thereinto, and a laundry treatment apparatus including the interface.

Technical Solution

According to an aspect of the present disclosure, an interface includes an encoder including a fixing portion, a rotating portion rotatably coupled to the fixing portion, and a signal generator connected to a circuit board and configured to generate an electrical signal during rotation of the rotating portion, an actuator including a shaft fixed to the rotating portion, a handle fixed to the shaft and configured to receive a force required for rotation of the shaft, and an accommodation space formed in the handle, a display unit including a fastening body fixed to the fixing portion to pass through the shaft, an accommodation body fixed to the fastening body and located inside the accommodation space, a mounting space formed in the accommodation body, a fastening body through hole communicating with the mounting space to pass through the fastening body, an accommodation body through hole communicating with the mounting space to pass through the accommodation body, a display fixed to the accommodation body and configured to display information, a cover fixed to the accommodation body and configured to close the accommodation body through hole, and a wire inserted into the fastening body through hole and configured to transmit power or a signal to the display, and a sealing portion configured to block flowing of external air and water into the mounting space.

The sealing portion may include a fastening body sealing portion provided in the fastening body through hole to fix a position of the wire and configured to block flowing of water into the fastening body through hole.

The fastening body sealing portion may include a sealing body inserted into the fastening body through hole, a sealing body through hole that is provided to pass through the sealing body and into which the wire is inserted, and a cut portion formed by cutting a circumferential surface of the sealing body to connect the circumferential surface of the sealing body to the sealing body through hole.

The sealing body may include a material with a greater elasticity than the fastening body, and a diameter of the sealing body may be set to be greater than a diameter of the fastening body through hole.

A diameter of the sealing body through hole in a state in which the sealing body is inserted into the fastening body through hole may be set to be less than a diameter of the wire.

The interface may further include a first contact protrusion protruding toward the fastening body through hole from the circumferential surface of the sealing body and provided along the circumferential surface of the sealing body.

The cut portion may include a first cut surface directed toward a center of the sealing body through hole from the circumferential surface of the sealing body, a second cut surface directed toward a center of the sealing body through hole from the circumferential surface of the sealing body, and a cut groove formed between the first cut surface and the second cut surface, and the first contact protrusion may extend to the second cut surface from the first cut surface along the circumferential surface of the sealing body.

An interval between the first cut surface and the second cut surface may be set to a length for closing the cut groove when the sealing body is inserted into the fastening body through hole.

The interface may further include a second contact protrusion protruding from at least one of the first cut surface and the second cut surface toward another one and extending toward the sealing body through hole from the circumferential surface of the sealing body.

The second contact protrusion may be provided to connect the sealing body through hole and the first contact protrusion.

The interface may further include a band-shaped third contact protrusion protruding toward a center of the sealing body through hole from the sealing body.

The sealing portion may include a cover sealing portion fixing the cover to the accommodation body to block flowing of external air and water into the mounting space through the accommodation body through hole.

The display may be configured to display preset information according to the electrical signal generated by the signal generator The interface may further include a selection unit provided in the mounting space and configured to determine whether to select a control command displayed on the display by detecting whether a body of a user is in contact with the cover.

The actuator may further include a disk-shaped base fixed to a circumferential surface of the shaft, a plurality of base fasteners provided on the handle and fixed to the base, and a handle outlet provided to pass through the base or the handle and configured to guide water flowing into the accommodation space to an outside of the handle.

The interface may further include a fastening guide provided on the handle and located between one base fastener and another base fastener, and a guide groove that is provided in a groove formed by bending a circumferential surface of the base toward the shaft through hole and in which the fastening guide is accommodated.

A depth of the guide groove may be set to be greater than a height of the fastening guide, and the handle outlet may be set to a hole formed between the guide groove and the fastening guide.

Advantageous Effects

The present disclosure provides an interface in which display of a control command, search or change of the displayed control command, and selection of the displayed control command are integrated into one device, and a laundry treatment apparatus including the interface.

The present disclosure provides an interface for minimizing a space required for installation, and a laundry treatment apparatus including the interface.

The present disclosure provides an interface for minimizing the possibility of flowing of water or foreign substances thereinto, and a laundry treatment apparatus including the interface.

BEST MODE

Embodiments of an interface and a laundry treatment apparatus including the interface will be described in detail with reference to the accompanying drawings.

Figure 1:
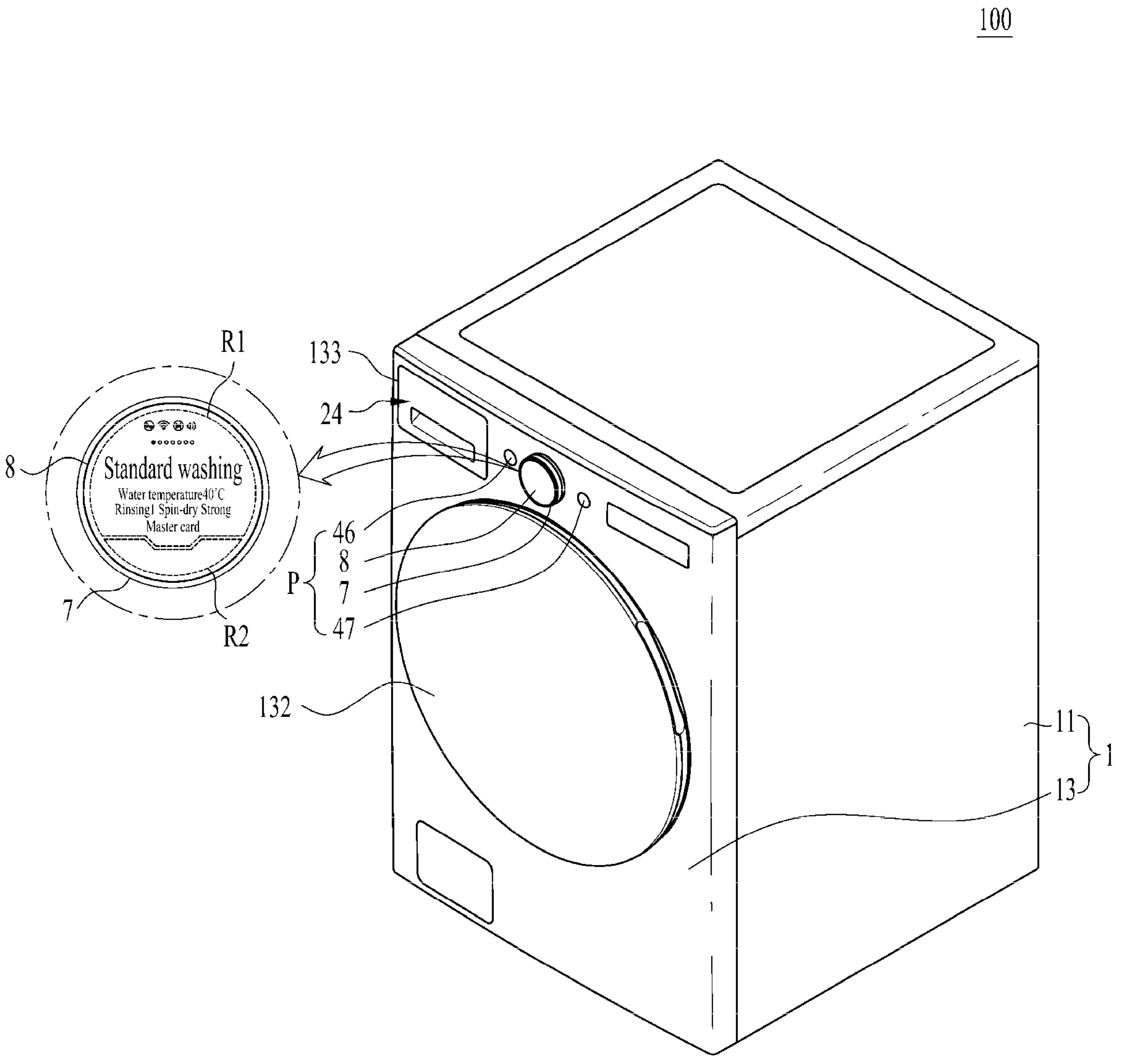
FIGS. 1 and 2 show an example of an interface and a laundry treatment apparatus including the interface.

As shown in FIG. 1, the laundry treatment apparatus 100 includes a cabinet 1 and an interface P provided in the cabinet 1. The interface P described herein refers to a device or a program for communication between a user and a laundry treatment apparatus (which includes other electronic devices including the laundry treatment apparatus). Communication between the user and the laundry treatment apparatus refers to a process of inputting a control command to the laundry treatment apparatus and a process of transferring information to the user.

The cabinet 1 may include a cabinet body 11 with one open surface and a front panel 13 fixed to the open surface of the cabinet body. FIG. 1 shows an example of the case in which the front panel 13 is fixed to a front side of the cabinet body 11 to define a front surface of the laundry treatment apparatus.

Figure 2:
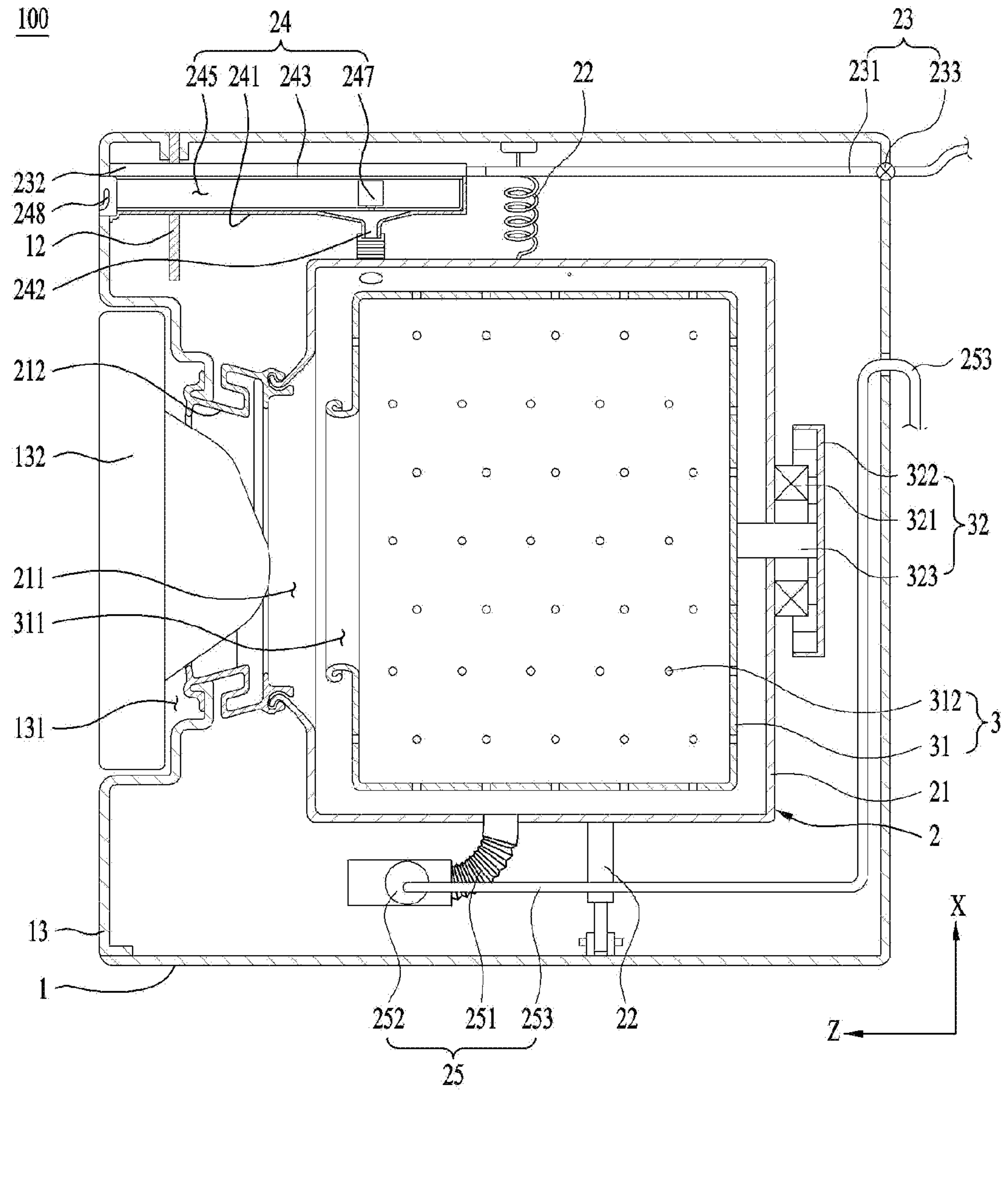

As shown in FIG. 2, the front panel 13 may include a panel inlet 131 for communication between inside and outside of the cabinet 1. The panel inlet 131 is provided to be closed by a door 132 pivotably fixed to the cabinet 1.

A tub 2 providing a space in which water is stored and a drum 3 that is pivotably provided in the tub and provides a space in which a clothing (generic name of a laundry object) may be provided inside the cabinet 1.

The tub 2 may include a cylindrical tub body 21 with an empty interior. The tub body 21 may be fixed inside the cabinet 1 through a tub support 22, and FIG. 2 shows an example of the case in which the tub support 22 includes a spring (which connects an upper space of the tub body to the cabinet) and a damper (which connects a lower space of the tub body to the cabinet).

A tub inlet 211 is provided on a surface of the space provided by the tub body 21, which faces the panel inlet 131, and the panel inlet 131 and the tub inlet 211 are connected to each other through a gasket 212. The gasket 212 is a device that includes an elastic body such as a rubber to prevent water inside the tub body 21 from being discharged into the cabinet 1 and minimize transmission of the vibration of the tub body 21 to the cabinet 1.

Water may be supplied to the tub body 21 through a water supply 23, and the water stored in the tub body 21 may be discharged to the outside of the cabinet 1 through a drainage 25.

The drainage 25 may include a pump 252 located at a point lower than a bottom surface of the tub body 21, a first drainage pipe 251 connecting the tub body 21 and the pump 252, and a second drainage pipe 253 guiding water discharged from the pump 252 to the outside of the cabinet.

The water supply 23 may include a water supply pipe 231 connecting a water source located outside the cabinet to the tub body 21, and a water supply valve 233 configured to control opening and closing of the water supply pipe 231.

As shown in the drawing, the laundry treatment apparatus 100 may further include a detergent supply 24.

Figure 3:
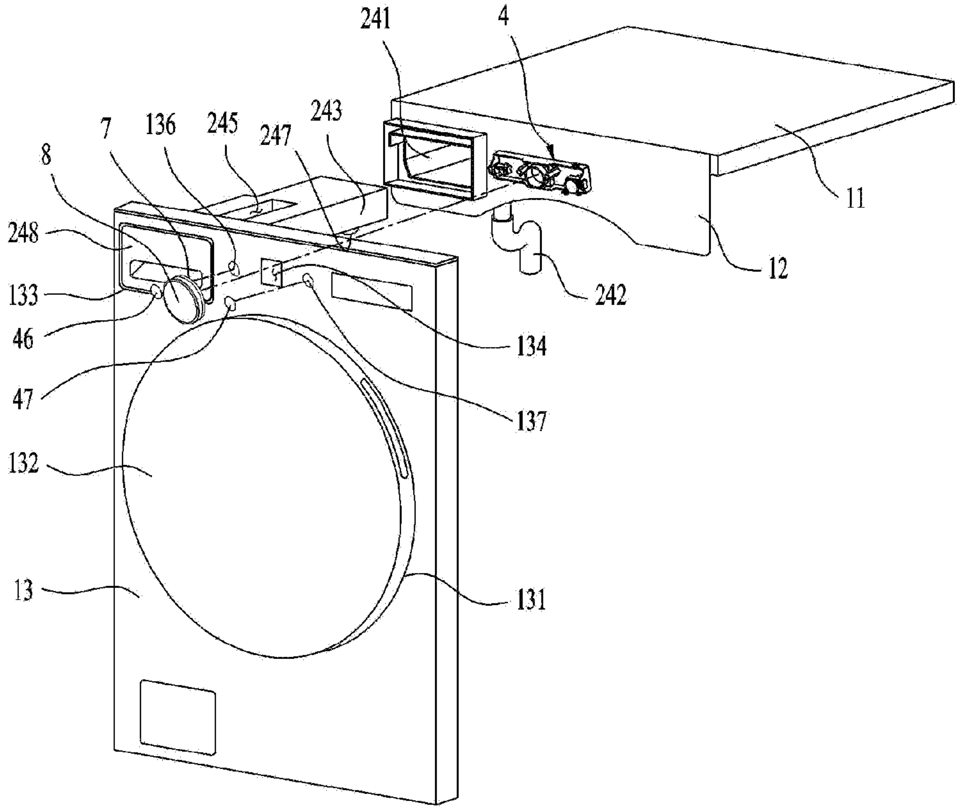
FIGS. 3 and 4 show an example of a coupling structure of a cabinet and an interface.

As shown in FIG. 3, the detergent supply unit 24 may include a drawer housing 241 provided inside the cabinet 1, a connection pipe 242 connecting the drawer housing to the tub body 21, and a drawer 243 that is retracted or extended into or out of the drawer housing 241 through a drawer inlet 133 provided in the front panel 13.

The drawer 243 may include a chamber 245 providing a space in which a detergent is stored, and a discharge flow path 247 discharging the detergent inside the chamber to the drawer housing 241. The discharge flow path 247 may include a water trap (siphon flow path) moving a liquid to the drawer housing 241 when a level of the liquid stored in the chamber 245 exceeds a preset water level.

When the detergent supply 24 is provided in the laundry treatment apparatus 100, the water supply 23 may further include a nozzle 232 supplying water to the chamber 245. The nozzle 232 may be fixed to the cabinet 1 to define an upper surface of the drawer housing 241, and the water supply pipe 231 may be provided to connect a water source to the nozzle 232.

A drawer panel 248 may be provided on a front surface of the drawer 243. The drawing panel 248 may be provided to close the drawer inlet 133 and may include a drawer handle.

As shown in FIG. 2, the drum 3 may include a cylindrical drum body 31 located inside the tub body 21, and a driver 32 rotatably fixing the drum body 31 to the tub body 21.

A drum inlet 311 may be provided in a surface of a space provided by the drum body 31, which faces the tub inlet 211. Thus, clothes may be put into the drum body 31 through the panel inlet 131, the tub inlet 211, and the drum inlet 311.

A drum through hole 312 for communication between inside and outside of the drum body may be provided in the drum body 31. The drum through hole 312 may be provided in each of a circumferential surface, a front surface (surface surrounding the drum inlet), and a rear surface of the drum body 31. Therefore, water or detergent supplied inside the tub body 21 may be supplied inside the drum body 31 through the drum through hole 312.

The driver 32 may include a stator 321 that is fixed to a rear surface of the tub body 21 to form a revolving magnetic field, a rotor 322 rotating by the revolving magnetic field, and a rotation shaft 323 passing through the rear surface of the tub body 21 and connecting the drum body 31 to the rotor 322.

Figure 4:
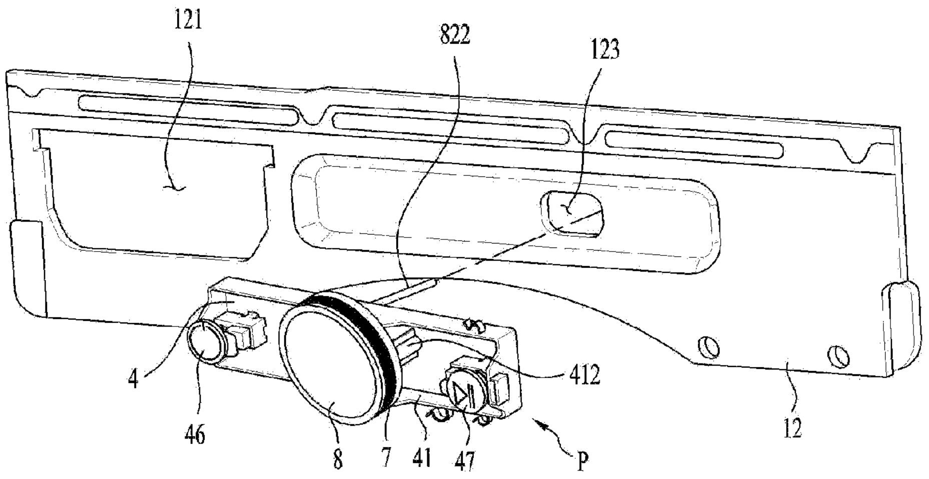

As shown in FIG. 3, the front panel 13 may be fixed to the cabinet body 11 through a panel support 12. That is, the panel support 12 may be fixed to the cabinet body 11, and the front panel 13 may fixed to the panel support 12. In this case, as shown in FIG. 4, the panel support 121 may include a drawer through hole 121 through which the drawer 243 passes.

The interface P may be fixed to an interface mounting groove provided in the panel support 12, or may be fixed to the front panel 13 to be positioned in the interface mounting groove.

Figure 5:
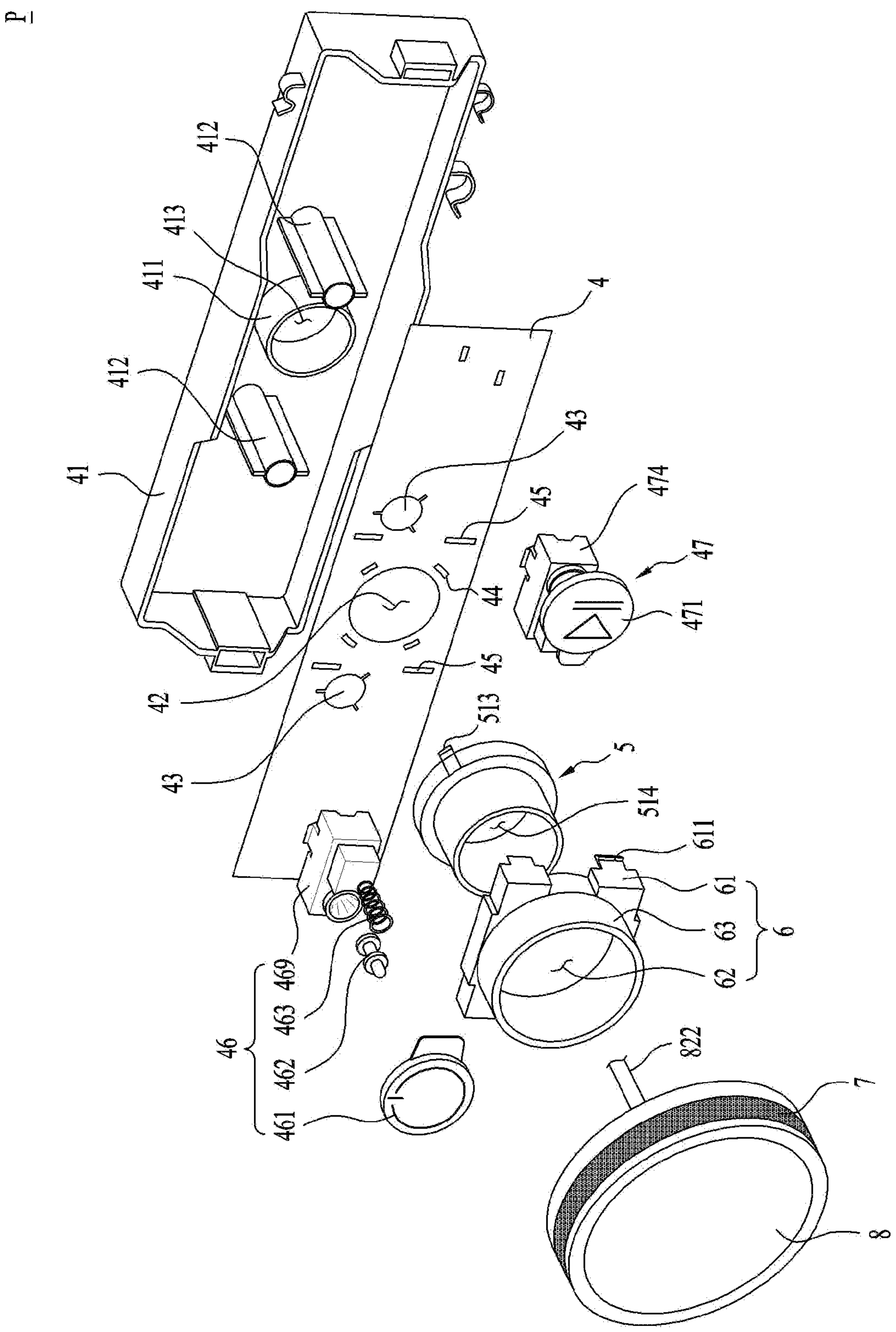
FIG. 5 shows the configuration of an interface.

As shown in FIG. 5, the interface P may include a circuit board 4 (first circuit board) located inside the cabinet 1, an encoder 5 fixed to the circuit board and located inside the cabinet 1, an actuator 7 connected to the encoder 5 to pass through the front panel 13, and a display unit 8 fixed to the encoder 5 or the first circuit board 4 to pass through the front panel 13.

The first circuit board 4 may be a board including a control circuit required to control (power control or operation control) at least one of the driver 32, the water supply valve 233, and the pump 252 and may be fixed to the front panel 13 or the panel support 12 through a case 41. The first circuit board 4 may include a first board fixed to the case 41, and a circuit (first circuit) fixed to the first board.

The case 41 may be provided in any shape as long as the first circuit board 4 is to be fixed to the front panel 13 or the panel support 12, and FIG. 5 shows an example of the case in which the case 41 has one open surface (which faces the panel support) with a hexahedron shape.

The case 41 may include a boss configured to set a position of the first circuit board 4. FIG. 5 shows an example of the case in which the boss includes a first boss 411 and a second boss 412. In this case, the first circuit board 4 may include a board through hole 42 through which the first boss 411 passes and a boss insertion hole 43 through which the second boss 412 passes. When the first circuit board 4 includes a first board and a first circuit, the board through hole 42 and the boss insertion hole 43 may be provided to pass through the first board. The second boss 412 may be provided to be located in each of left and right spaces of the first boss 411, or may be provided to be located in each of upper and lower spaces of the first boss 411.

A wire 822 may be connected to the display unit 8, and the wire 822 may include a power line supplying power to the display, and a communication line for communication between the display unit 8 and devices inside the cabinet including the first circuit board 4.

The first boss 411 may include a first boss through hole 413, and the panel support 12 may include a wire through hole 123 (refer to FIG. 4). In this case, the wire 822 may be inserted into the first boss through hole 413 and the wire through hole 123 to extend inside the cabinet 1.

The first circuit board 4 may further include a first input unit 46 and a second input unit 47. The first input unit 46 may include a device that inputs a control command requesting power supply to the laundry treatment apparatus 100, and the second input unit 47 may include a device configured to input a command requesting execution of the control command displayed on the display unit 8 or a command requesting a temporary interruption of the control command that is currently executed by the laundry treatment apparatus 100. The first input unit 46 and the second input unit 47 are fixed to the first board to be connected to the first circuit.

The first input unit 46 and the second input unit 47 may be provided to generate a control signal by detecting static electricity of a user body.

The first input unit 46 may include a first button 461 exposed out of the cabinet 1, a first detection sensor 464 fixed to the first circuit board 4, and a conductor 463 (first touch spring) connecting the first button to the first detection sensor. The second input unit 47 may include a second button 471 exposed out of the cabinet 1, a second detection sensor 474 fixed to the first circuit board 4, and a conductor (not shown, a second touch spring) connecting the second button to the second detection sensor.

As shown in FIG. 3, the front panel 13 may include a first button mounting portion 136 and a second button mounting portion 137, the first button 461 may be exposed out of the cabinet 1 through the first button mounting portion 136, and the second button 471 may be exposed out of the cabinet 1 through the second button mounting portion 137.

The first input unit 46 and the second input unit 47 may be provided in left and right spaces of the display unit 8, respectively, may be provided in upper and lower spaces of the display, or may be placed up and down or left and right in any one of the left and right spaces of the display.

As shown in FIG. 5, the first touch spring 463 and the second touch spring may be provided in the form of a coil, which provides restoring force to the first button 461 and the second button 471. To prevent the first button 461 and the second button 471 from being separated from the button mounting portions 136 and 137, respectively, the first input unit 46 may include a first stopper 462 limiting a motion range of the first button, and the second input unit 47 may include a second stopper (not shown) limiting a motion range of the second button.

The encoder 5 is a device that generates an electrical signal during rotation of the actuator 7 (or generates an electrical signal differently set depending on a rotation angle of the actuator) while pivotably fixing the actuator 7 to the first circuit board 4.

Figure 6:
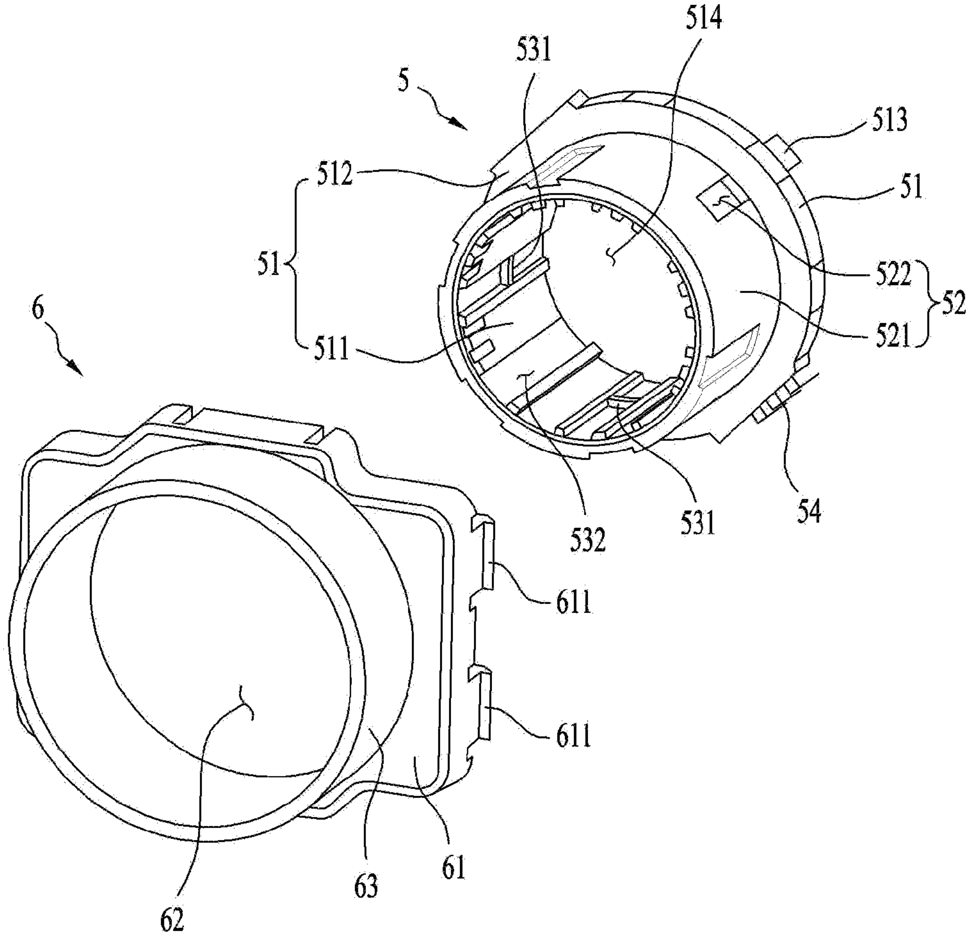
FIGS. 6 and 7 show an example of an encoder and an encoder cover provided on an interface.

As shown in FIG. 6, the encoder 5 may include a fixing portion 51 that is fixed to the first circuit board 4 and to which the display unit 8 is fixed, a rotating portion 52 that is rotatably fixed to the fixing portion 51 and to which the actuator 7 is fixed, and a signal generator 54 that generates an electrical signal during rotation of the rotating portion 52. The fixing portion 51 may be fixed to the first board, and the signal generator 54 may be fixed to the first fixing portion 51 to be connected to the first circuit.

The fixing portion 51 may include a fixing body 512 fixed to the first circuit board 4, a support body 511 that extends from the fixing body 512 and to which the rotating portion 52 is rotatably fixed, and a body through hole 514 that passes through the fixing body and the support body and is connected to the board through hole 42 (connected to the first boss through hole).

The fixing body 512 may be provided in a cylindrical shape. A substrate fastener 513 may be provided on a circumferential surface of the fixing body 512 or one surface of the fixing body (which faces the first circuit board). In this case, the first circuit board 4 may include an encoder fixing hole 44 (refer to FIG. 5) into which the substrate fastener 513 is inserted.

As shown in FIG. 5, the substrate fastener 513 and the encoder fixing hole 44 may be provided in a plural number, and the encoder fixing hole 44 may be disposed to surround the board through hole 42.

As shown in FIG. 6, a fastening body fixing portion 531 fastening the display unit 8 to the fixing portion 51, and a position setting groove 532 preventing rotation of the display unit 8 (fixing the position of the display) when the display unit 8 is inserted into the body through hole 514 may be provided inside the body through hole 514.

The fastening body fixing portion 531 may include a protrusion that protrudes toward the center of the body through hole 514 from at least one of the support body 511 and the fixing body 512. The diagram shows an example of the case in which the fastening body fixing portion 531 is provided on the support body 511.

The position setting groove 532 may include a groove formed by concavely bending one surface of the fixing portion 51, which defines the body through hole 514. In this case, the position setting groove 532 may be provided in a length direction of the body through hole 514.

The rotating portion 52 may include a rotating body 521 rotatably coupled to the support body 511. The rotating body 521 needs to include a rotating body through hole through which the support body 511 passes.

The rotating body 521 may include a shaft fastener 522 to which the actuator 7 is fastened. The shaft fastener 522 may include a fastening hole formed to pass through the circumferential surface of the rotating body 521, or may include a fastening groove formed by concavely bending the circumferential surface of the rotating body 521.

The signal generator 54 may include a magnet fixed to the rotating body 521, a sensor provided on the fixing body 512 or the support body 511 to detect magnetic force, and a terminal connecting a first circuit provided on the first circuit board 4 to the sensor. The magnet may include a plurality of permanent magnets that are spaced apart from each other along the circumferential surface of the rotating body 521.

Figure 7:
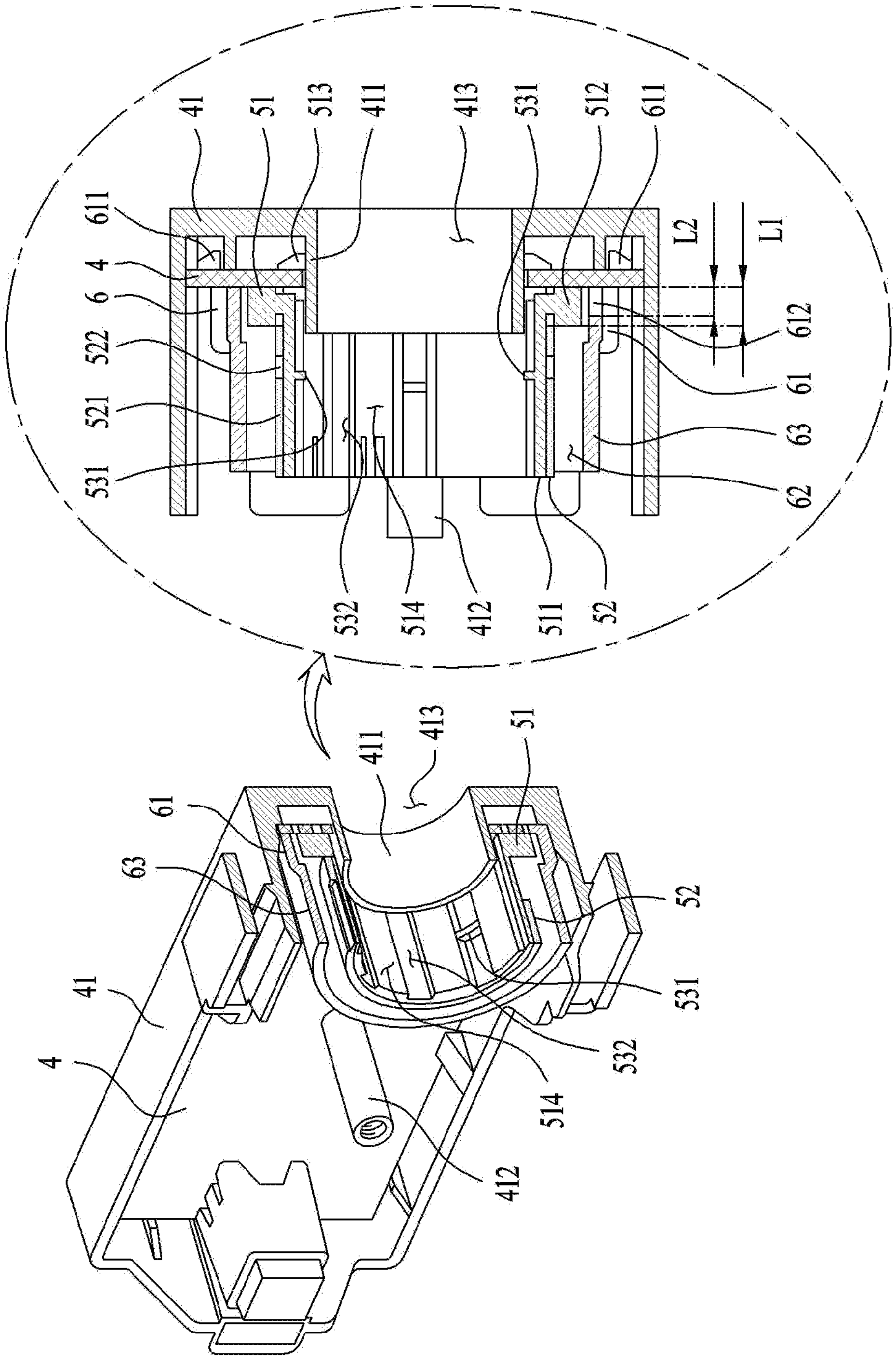

As shown in FIG. 7, the first circuit board 4 assembled with the encoder 5 may be coated with an insulating material. This is to minimize the possibility of short circuits by supplying water to the first circuit board 4. To prevent the rotating body 521 from being fixed to the support body 511 by the insulating material when the insulating material is applied to one surface of the first circuit board 4 (which faces the front panel), an encoder cover 6 may be further provided on the interface P.

The encoder cover 6 may be fixed to the first circuit board 4 and may be provided in the form of a pipe surrounding the encoder 5. That is, as shown in the diagram, the encoder cover 6 may include a fixing body cover 61 fixed to the first circuit board 4 (fixed to the first board) to surround the fixing body 512, and a cover through hole 62 that is provided to pass through the fixing body cover 61 and into which the encoder 5 is inserted.

A substrate fastener 611 may be provided on the fixing body cover 61, and an encoder cover fixing hole 45 to which the substrate fastener 611 is fixed may be provided on the first circuit board 4 (the encoder cover fixing hole may be provided in the first board). The substrate fastener 611 and the encoder cover fixing hole 45 may be provided in a plural number, and the encoder cover fixing holes 45 may be arranged to surround the substrate fastener 513.

To discharge water flowing into the fixing body cover 61, a cover outlet 612 may be further provided on the circumferential surface of the fixing body cover 61. The cover outlet 612 may be located at the bottom of the circumferential surface of the fixing body cover 61.

The aforementioned insulating material may be applied to the first circuit board 4 after both the encoder 5 and the encoder cover 6 are coupled thereto, and the insulating material sprayed to a partial region of the first circuit board 4 (external space of the encoder cover) may flow into the encoder cover 6 through the cover outlet 612. In this process, to block supply of the insulating material to the rotating body 521, a distance L1 to the uppermost end of the fixing body 512 from the first circuit board may be set to be equal to or greater than a distance L2 to the uppermost end of the cover outlet 612 from the first circuit board.

The encoder cover 6 may further include a support body cover 63 extending from the fixing body cover 61 and surrounding the rotating body 521 (surrounding the support body). The support body cover 63 may limit movement of the actuator 7 in a diameter direction of the cover through hole 62, and thus may prevent the actuator 7 from being separated from the rotating body 521.

Figure 8:
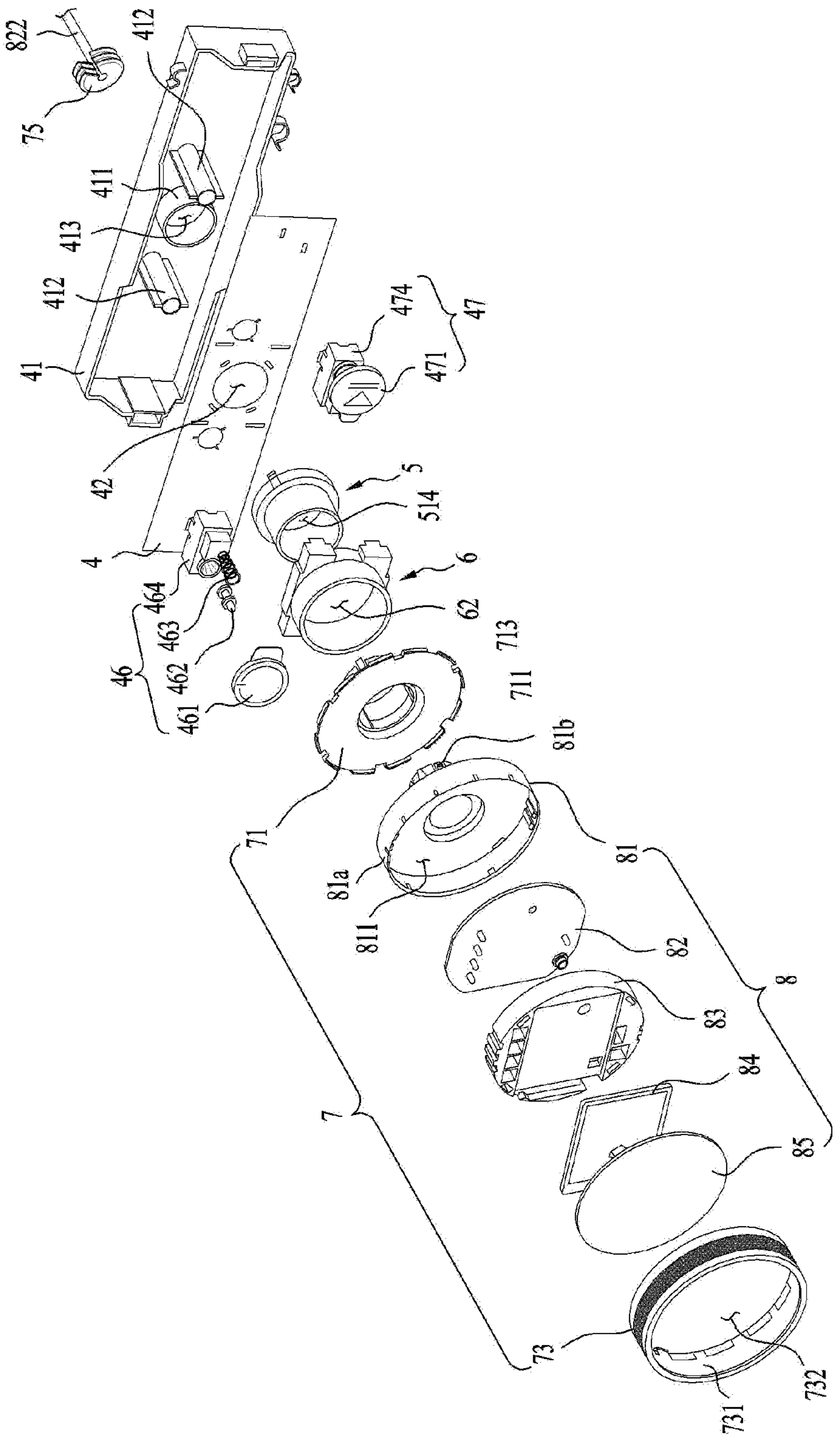
FIG. 8 shows an example of an actuator and a display unit provided on an interface.

As shown in FIG. 8, the actuator 7 may include a shaft 71 fixed to the rotating body 521 to pass through front panel 13, and a handle 73 fixed to the shaft 71 and located outside the cabinet 1.

The cabinet 1 may include a panel through hole 134 (refer to FIG. 3) formed to pass through the front panel 13, and the shaft 71 may be formed to pass through the panel through hole 134.

Figure 9:
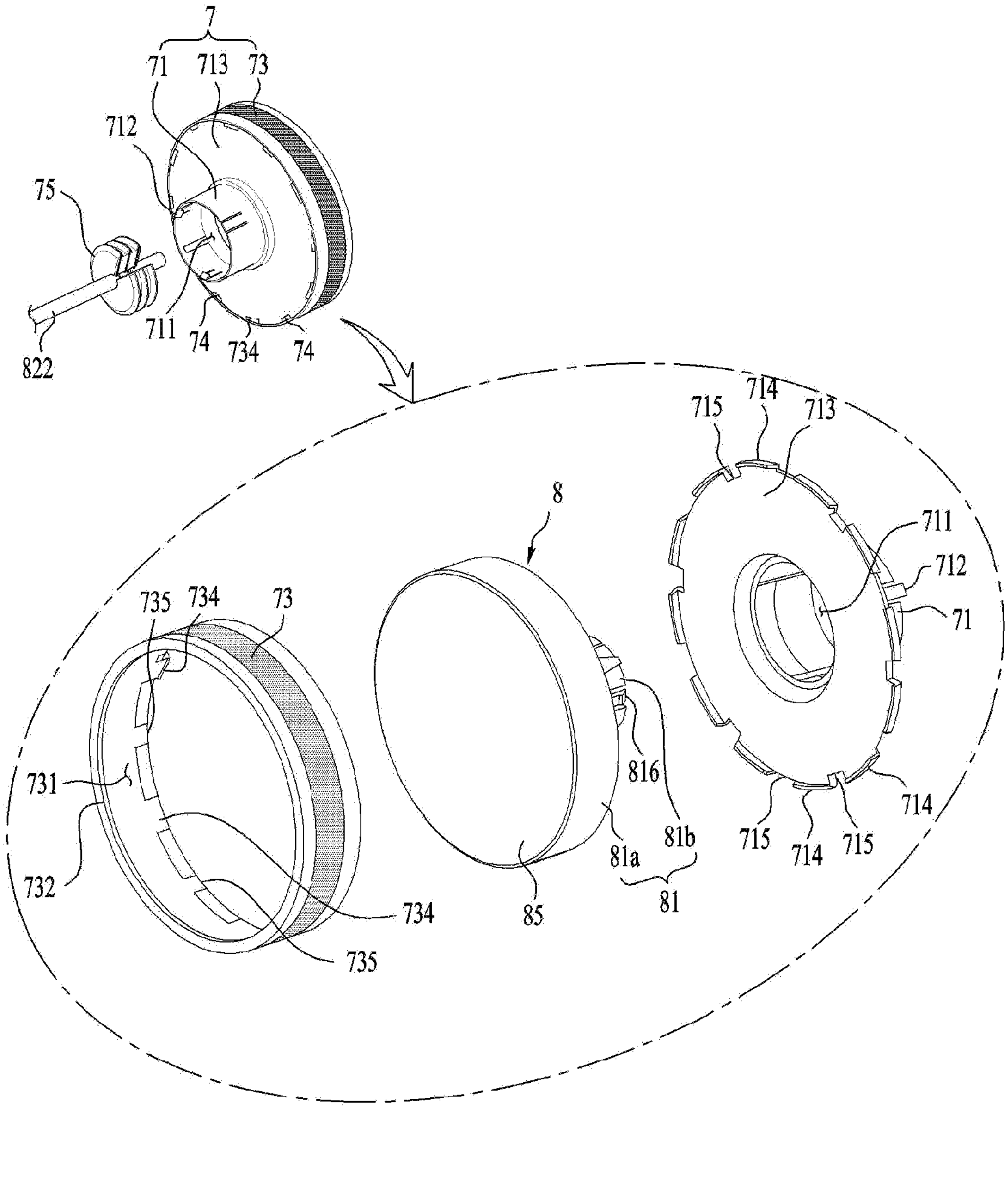
FIGS. 9 and 10 show the configuration of an actuator.

As shown in FIG. 9, the shaft 71 may include a pipe provided with a shaft through hole 711 formed therein. The rotating body 521 provided on the encoder may be inserted into the shaft through hole 711, and a rotating body fastener 712 provided on a circumferential surface of the shaft 71 and located inside the shaft through hole 711 may be coupled to a shaft fastener 522 provided on the rotating body. Thus, the shaft 71 may be fixed to the rotating body 521 through the rotating body fastener 712 and the shaft fastener 522.

The handle 73 may be fixed to the shaft 71 to be positioned outside of the cabinet 1, and a user may supply force required for rotation of the rotating body 521 to the shaft 71 through the handle 73.

The handle 73 may include an accommodation space 731 formed inside the handle to communicate with the shaft through hole 711 and a handle through hole 732 formed to pass through one surface of the handle 73 for communication between the accommodation space 731 and the outside.

When a diameter of the handle 73 is set to be greater than a diameter of the shaft 71, a base 713 to which the handle 73 is fixed may be further provided on the shaft 71. The base 713 may include a disk fixed to the circumferential surface of the shaft 71.

The handle 73 and the base 713 may be coupled to each other through a base fastener 734 provided on the handle 73 and a handle fastener 714 provided on the base 713.

Figure 10:
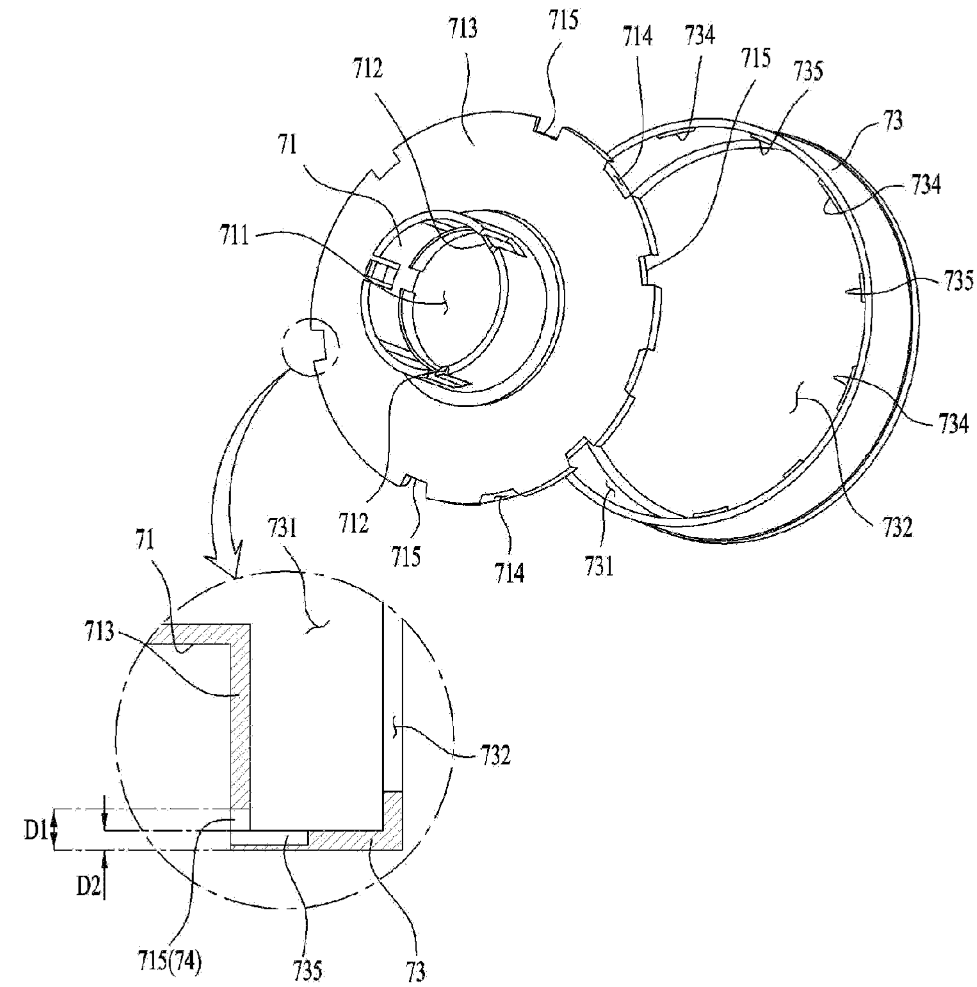

As shown in FIG. 10, the base fastener 734 may include a plurality of protrusions fixed to the handle to be located inside the accommodation space 731, and the handle fastener 714 may include a groove that is provided in the base 713 and in which the protrusion is accommodated.

To facilitate coupling between the handle 73 and the base 713, the handle 73 may include a fastening guide 735 located between the base fastener 734 and another base fastener 734, and the base 713 may include the guide groove 715 into which the fastening guide 735 is inserted. The guide groove 715 may include a groove formed by bending the circumferential surface of the base 713 toward the shaft through hole 711.

To discharge water or foreign substances flowing into the handle 73 to the outside of the handle 73, the handle outlet 74 may be provided in any one of the handle 73 and the base 713. As shown in FIG. 10, a depth D1 of the guide groove 715 (a length to a bottom surface of the guide groove from an edge of the base) may be set to be greater than a height D2 of the fastening guide 735 (a length to a free end of the fastening guide from the handle). In this case, the handle outlet 74 may be set as a space formed between the guide groove 715 and the fastening guide 735.

Figure 11:
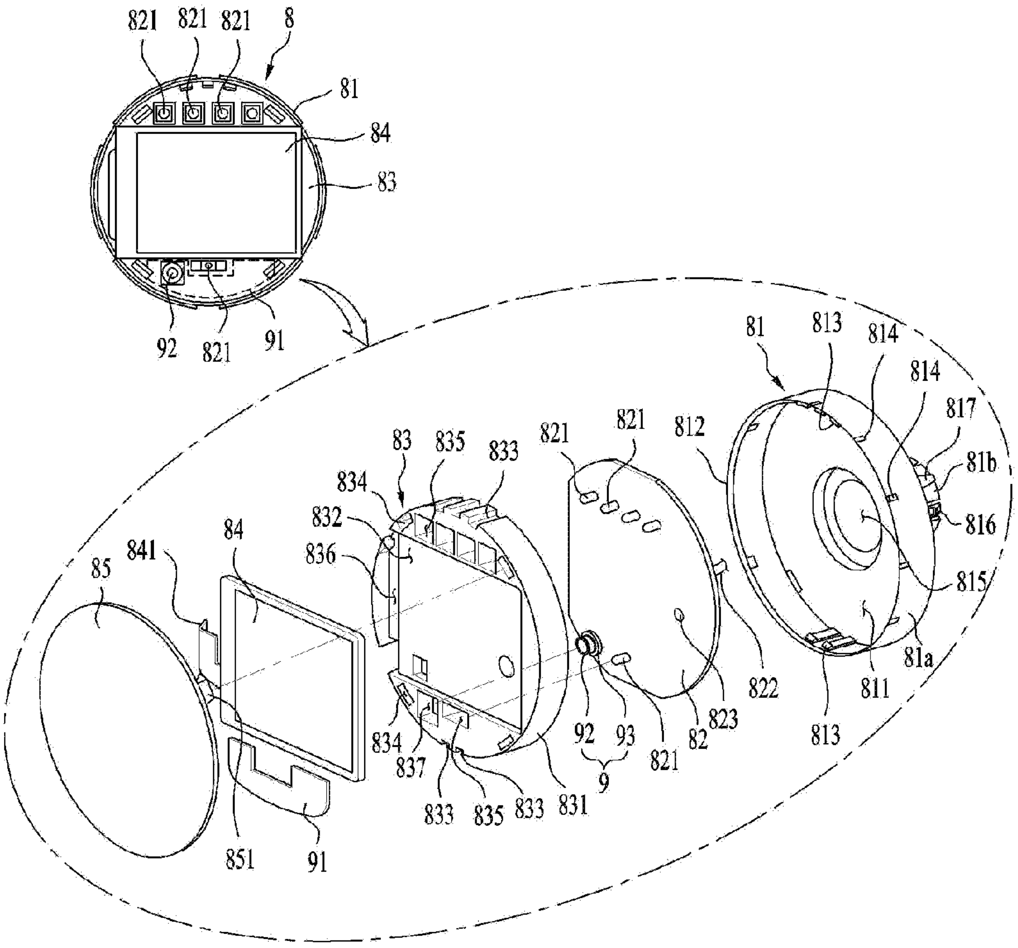
FIGS. 11 and 12 show the configuration of a display unit.

FIG. 11 shows an example of a display unit 8, and the display unit 8 may include a housing 81 fixed to the fixing body 512 of the encoder and located inside the accommodation space 731 of the actuator, a display 84 fixed to the housing and displaying information (information related to control and operating of the laundry treatment apparatus), and a circuit board 82 (a second circuit board and a display unit circuit board) provided on the housing and controlling the display 84.

The housing 81 may include a fastening body 81*b* fixed to the fixing body 512 by inserting the body through hole 514 through the shaft through hole 711, and an accommodation body 81*a* fixed to the fastening body 81*b* and located inside the accommodation space 731.

The accommodation body 81*a* may be provided in any shape as long as the accommodation body 81*a* is to be inserted into the accommodation space 731, and FIG. 11 shows an example in which the accommodation body 81*a* is provided in a cylindrical shape.

A mounting space 811 is formed inside the accommodation body 81*a*, and the mounting space 811 is provided to communicate with the accommodation space 731 provided in the handle through an accommodation body through hole 812 (the accommodation body through hole is provided to communicate with the handle through hole). That is, the accommodation body through hole 812 is provided in a surface of a space provided by the accommodation body 81*a*, which faces the handle through hole 732.

Figure 12:
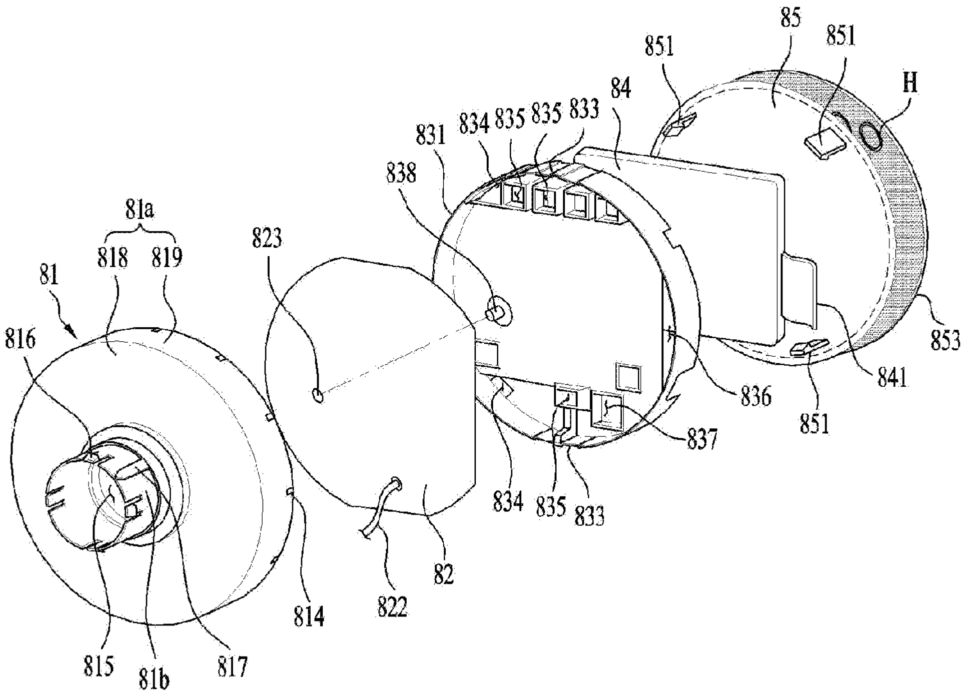

The fastening body 81*b* may be provided in any shape as long as the fastening body 81*b* is inserted to the shaft through hole 711 and the body through hole 514 of the encoder, and FIG. 12 illustrates an example of the case in which the fastening body 81*b* is provided in a cylindrical shape. The fastening body 81*b* includes a fastening body through hole 815 connected to the mounting space 811.

A fixing body fastener 816 may be provided on the circumferential surface of the fastening body 81*b*. The fixing body fastener 816 is a device that fixes the housing 81 to the fastening body fixing portion 531 provided on the encoder.

A plurality of position setting protrusions 817 may be further provided on the circumferential surface of the fastening body 81*b*.

The position setting protrusion 817 may be provided in a shape to be inserted into the position setting groove 532 provided in the encoder, and the position setting protrusions 817 may be located at a point corresponding to a position of the position setting groove 532. The position setting protrusions 817 and the position setting groove 532 may be devices that minimize a risk in that the fixing body fastener 816 is not coupled to the fastening body fixing portion 531 when the fastening body 81*b* is inserted into the body through hole 514 (devices that ensure coupling between the fixing body fastener and the fastening body fixing portion).

As shown in FIG. 11, the second circuit board 82 may be inserted into the mounting space 811, and the wire 822 connected to the second circuit board 82 may be extended out of the housing 81 through the fastening body through hole 815. The second circuit board 82 may include a second board and a second circuit fixed to the second board.

As shown in FIG. 11, the second circuit board 82 may be inserted into the mounting space 811, and the wire 822 connected to the second circuit board 82 may be extended out of the housing 81 through the fastening body through hole 815. The second circuit board 82 may include a second board and a second circuit fixed to the second board.

As shown in FIG. 12, the accommodation body 81*a* may include a disk-shaped accommodation body base 818 extending in a diameter direction of the fastening body through hole 815 from the circumferential surface of the fastening body 81*b*, and an accommodation body circumferential surface 819 extending in a length direction of the fastening body 81*b* from an edge of the accommodation body base. In this case, the mounting space 811 may be formed by the accommodation body base 818 and the accommodation body circumferential surface 819. When the second circuit board 82 is provided in the mounting space 811 as described above, a risk in that the second circuit board 82 is damaged by external force may be minimized.

As shown in FIG. 11, the second circuit board 82 may include a plurality of lamps 821. That is, the display unit may include the plurality of lamps 821 fixed to the second board to be connected to the second circuit.

The second circuit board 82 may control the display 84 to display preset information according to rotation of the handle 73 (according to an electrical signal provided by the signal generator).

To maintain an interval between the second circuit board 82 and the display 84, prevent damage to the lamps 821, and guide light emitted from the lamps 821 to the outside of the mounting space 811, the mounting space 811 may include a mounting portion 83 located between the display 84 and the second circuit board 82.

The mounting portion 83 may include a mounting body 831 fixed to the accommodation body 81*a* and located inside the mounting space 811. The mounting body 831 may be provided in any shape as long as the mounting body 831 is to be inserted into the mounting space 811, and FIG. 11 shows an example of the case in which the mounting body 831 is provided in an approximate cylindrical shape.

An accommodation groove 832 to which the display 84 is fixed may be provided on one surface of the mounting body 831. The accommodation groove 832 may include a connector through hole 836, and a connector 841 (flexible PCB) provided on the display 84 may be connected to the second circuit board 82 by being inserted into the connector through hole 836.

The mounting body 831 may include lamp through holes 835 into which the lamps 821 is inserted. The number of the lamp through holes 835 may be the same as the number of the lamps 821, and the positions of the lamp through holes 835 need to be set to a space of a mounting body located above the accommodation groove 832 or a space of the mounting body located below the accommodation groove 832. This is to transmit light emitted from the lamps 821 to the outside of the housing 81 through the lamp through holes 835.

The mounting portion 83 may be fixed to the housing 81 through a mounting body fastener 813 provided on the accommodation body 81*a* and an accommodation body fastener 833 provided on the mounting body 831. The mounting body fastener 813 may include a plurality of protrusions located inside the mounting space 811, and the accommodation body fastener 833 may include grooves that are provided in the circumferential surface of the mounting body 831 (one surface of the mounting body in contact with the accommodation body) and fixed to the mounting body fastener 813.

The number of the mounting body fasteners 813 and the number of the accommodation body fasteners 833 need to be set to be equal to each other, and the positions of the mounting body fasteners 813 and the accommodation body fasteners 833 need to be set to correspond to each other.

To increase the fastening force of the mounting body 831, the accommodation body fastener 833 may include an upper fastener located higher than the accommodation surface 832 and a lower fastener located lower than the accommodation surface 832. Unlike in the diagram, the accommodation body fasteners 833 may be provided in left and right sides of the accommodation surface.

The accommodation body 81*a* may further include a cover 85 to prevent water and foreign substances from flowing into the display 84 and the second circuit board 82.

The cover 85 may be fixed to at least one of the accommodation body 81*a* and the mounting body 831 to close the accommodation body through hole 812. The cover 85 needs to include a material with a transparency for externally viewing information displayed on the display 84 and light emitted from the lamps 821.

When the cover 85 is fixed to the mounting body 831, the cover 85 may include a cover fixing protrusion 851 protruding toward the mounting body 831, and the mounting body 831 may include a fixing protrusion fastener 834 to which the cover fixing protrusion 851 is coupled.

As shown in FIG. 12, the second circuit board 82 may also be fixed to the mounting body 831. That is, the mounting portion 83 may include a protrusion 838 protruding toward the second circuit board 82 from the mounting body 831 and the second circuit board 82 may include a protrusion through hole 823 into which the protrusion 838 is inserted.

The cover 85 may further include a cover sheet 853 lowering the transparency of the cover. The transparency of the cover sheet may be set to an extent to which it is difficult to check the inside of the mounting space 811 from the outside (the transparency of the cover sheet is set to be lower than the transparency of the cover). The cover sheet 853 may be fixed to a surface of the cover 85, and a letter or symbol H may be provided in a region of the cover sheet, to which the lamp through holes 835 is projected.

As shown in FIG. 11, the interface P may further include a selection unit 9 that receives a control command to select the control command displayed on the display 84.

The selection unit 9 may be provided to determine whether to select the control command displayed on the display 84 by detecting whether the body of a user is in contact with the cover 85.

In other words, the selection unit 9 may include a sensor 93 provided on the second circuit board 82 (fixed to the second board to be connected to the second circuit) and configured to detect static electricity of the body of the user, and conductors 91 and 92 configured to connect the sensor 93 to the cover 85. The conductor 91 may include a first conductor 91 fixed to the cover 85, and a second conductor 92 having one end connected to the first conductor 91 and the other end connected to the sensor 93. In this case, the mounting body 831 need to include a conductor through hole 837 into which the second conductor 92 is inserted.

The first conductor 91 may be a device that facilitates input of a control command by expanding a region that a user is in contact. As shown in FIG. 1, in the interface P having the structure described above, a display region R1 is formed in an upper space of the cover 85, and an input region R2 is formed in a lower space of the cover 85. Therefore, when an area of the first conductor 91 is widened, an area of the input region R2 is expanded, and thus a user may easily input a control command. The area of the first conductor 91 may be set to ¼ to ½ or less of the cover 85.

As shown in FIG. 8, in the interface P having the structure described above, a diameter of the base 713 may be set to be longer than a diameter of the shaft through hole 711. This maximizes the volume of the acceptance space 731, thereby having a lot of devices inside the acceptance space 731.

When the volume of the accommodation space 731 increases, the volume of the mounting space 811 located in the accommodation space may be increased, and thus the size of the display 84 may also be increased.

The diagram shows the case in which the base 713 is provided in the form of a disk, and the shaft 71 is provided in a cylindrical shape, but the base 713 and the shaft 71 may be provided in various shapes. In this case, a cross-sectional area of the accommodation space 731 may be set to be greater than a cross-sectional area of the shaft 71 (a cross-sectional area of the base may be set with a larger area than a cross-sectional area of the shaft through hole).

The interface P having the aforementioned structure may allow display of a control command, search of the displayed control command, and selection of the displayed control command and minimize a space required for installation. However, the interface P having the structure described above requires a device that blocks flowing of water or foreign substances into the display unit 8 and the actuator 7 or discharges the flowing water or foreign substances to the outside.

Figure 13:
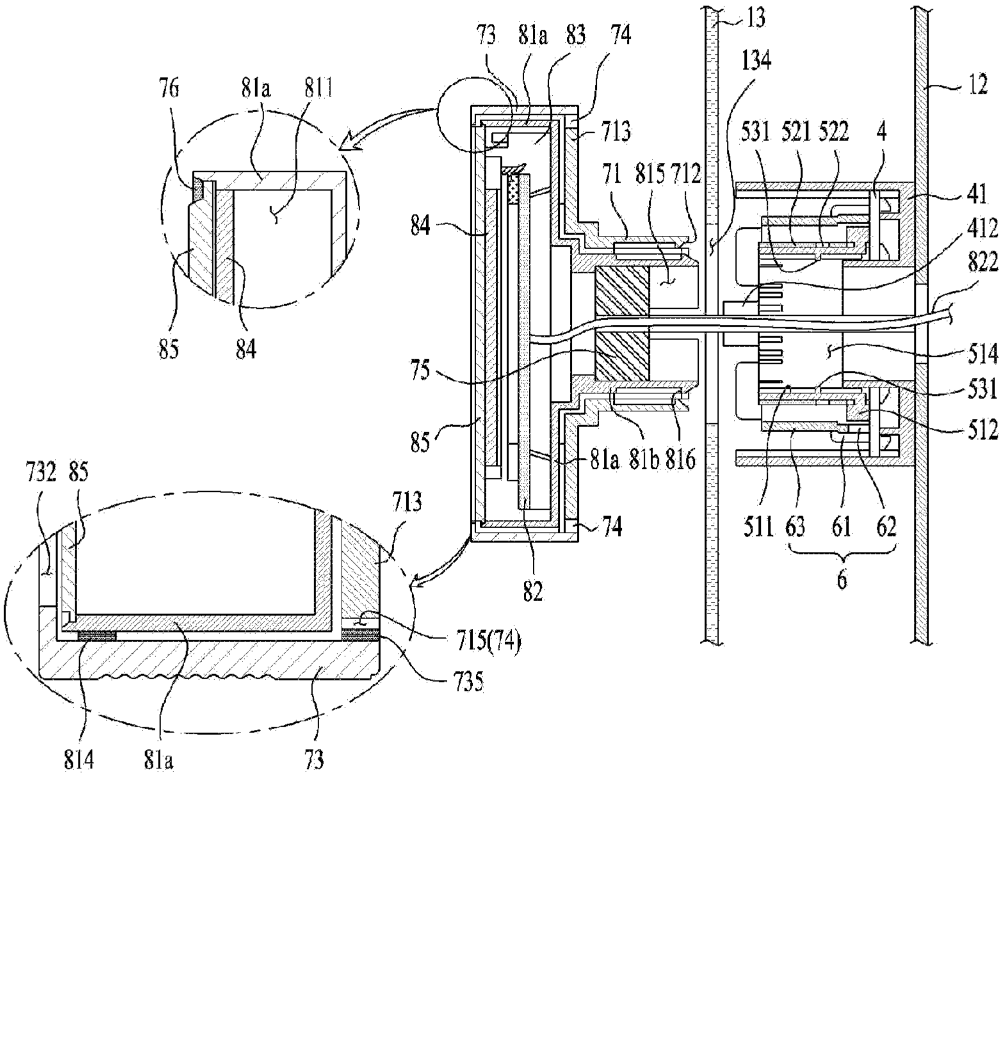
FIG. 13 shows an example of an assembly structure of an interface.

As shown in FIG. 13, the actuator 7 may include a device that discharges water or foreign substances flowing into handle through hole 732 to the outside of the accommodation space 731, and the display unit 8 may include a device that blocks flowing of foreign substances (outdoor air, liquid, and dust) into the housing 81.

As described above, the actuator 7 may discharge the water or foreign substances flowing into the accommodation space 731 through the handle outlet 74 provided in the handle.

The display unit 8 may include sealing portions 75 and 76 that blocks flowing of foreign substances into the fastening body through hole 815. That is, the interface P may include a fastening body sealing portion 75 blocking flowing of foreign substances through the fastening body through hole 815 and a cover sealing portion 76 blocking flowing of foreign substances through the accommodation body through hole 812.

The diagram shows the case in which the sealing portion includes both the fastening body sealing portion 75 and the cover sealing portion 76 are provided, but the sealing portion may include only one of the fastening body sealing portion 75 and the cover sealing portion 76.

The cover sealing portion 76 may include an adhesive material that is sprayed to the accommodation body 81*a* along an edge of the cover 85 to fill a space between the cover 85 and the accommodation body 812 and fixes the cover 85 to the accommodation body 812.

The fastening body sealing portion 75 may be inserted into the fastening body through hole 815 to fix the position of the wire 822 and may also block flowing of foreign substances into the fastening body through hole 815.

Figure 14:
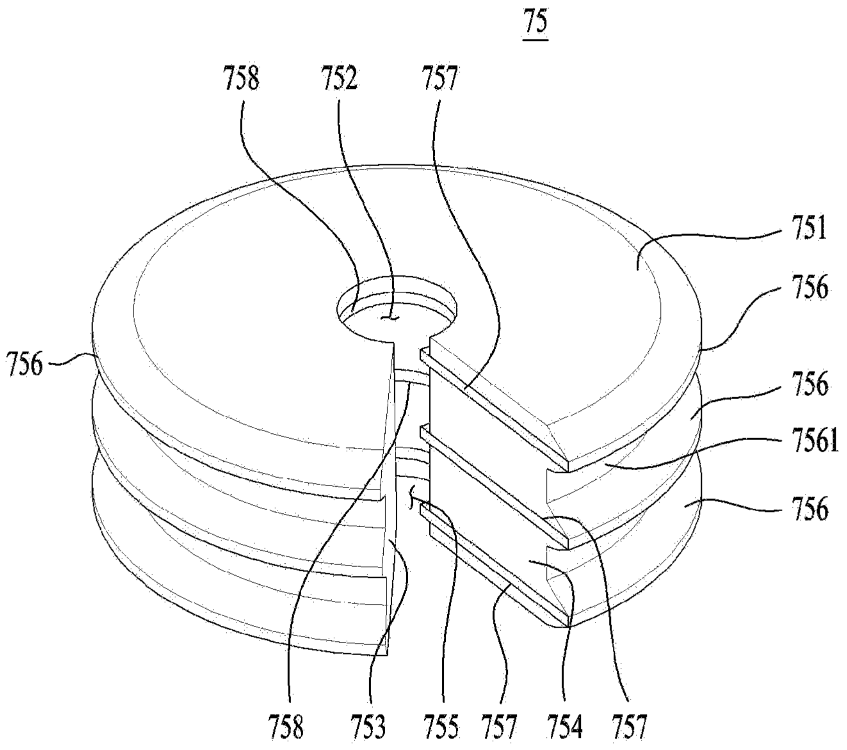
FIG. 14 shows an example of a sealing portion provided on an actuator.

FIG. 14 shows an example of the fastening body sealing portion 75. The fastening body sealing portion 75 of FIG. 14 may include a sealing body 751 inserted into the fastening body through hole 815, a sealing body through hole 752 that is provided to pass through the sealing body 751 and into which the wire 822 is inserted, and cut portions 753, 754, and 755 formed by cutting the circumferential surface of the sealing body 751 and connecting the circumferential surface of the sealing body 751 to the sealing body through hole 752.

The sealing body 751 may be provided in any shape as long as the sealing body 751 is to be inserted into fastening body through hole 815, and FIG. 14 shows an example of the case in which the sealing body 751 is provided in a cylindrical shape.

A diameter of the sealing body 751 may be set to be longer than a diameter of the fastening body through hole 815. In this case, a material of the sealing body 751 may be set as a rubber or silicon having a relatively large elasticity to close the fastening body through hole 815 through tight fitting.

The cut portion may include a first cut surface 753 directed toward the center of the sealing body through hole 752 from the circumferential surface of the sealing body 751, a second cut surface 754 directed toward the center of the sealing body through hole 752 from the circumferential surface of the sealing body 751 and spaced apart from the first cut surface 753, and a cut groove 755 formed between the first cut surface 753 and the second cut surface 754. The wire 822 may be inserted into the sealing body through hole 752 through the cut groove 755 or may be extended out of the sealing body through hole 752.

An interval between the first cut surface 753 and the second cut surface 754 may be set to a length by which the two cut surfaces 753 and 754 are in contact with each other to close the cut groove 755 when the sealing body 751 is inserted into the fastening body through hole 815.

To definitely block flowing of foreign substances into a space formed between the circumferential surface of the sealing body 751 and the fastening body through hole 815, a first contact protrusion 756 may be further provided on the circumferential surface of the sealing body 751.

The first contact protrusion 756 may include a band-shaped protrusion extending from the first cut surface 753 to the second cut surface 754 along the circumferential surface of the sealing body 751. The first contact protrusion 756 may be provided by arranging a plurality of band-shaped protrusions to be spaced apart from each other in a height direction of the sealing body 751.

To prevent flowing of foreign substances into the cut groove 755, the sealing body 751 may further include a second contact protrusion 757. The second contact protrusion 757 may protrude from at least one of the first cut surface 753 and the second cut surface 754 toward the other one.

The second contact protrusion 757 may be provided to connect the first contact protrusion 756 to the sealing body through hole 752, or connect a point 7561 between the two first contact protrusions 756 to the sealing body through hole 752.

To prevent foreign substances from flowing into a space between the wire 822 and the sealing body through hole 752, the sealing body through hole 752 may further include a third contact protrusion 758. This is because, even if a diameter of the sealing body through hole 752 (a diameter in a state in which the sealing body is inserted into the fastening body through hole) is set to be less than a diameter of the wire 822, the possibility of flowing of foreign substances through the sealing body through hole 752 may not be excluded.

The third contact protrusion 758 may include a band-shaped protrusion that protrudes toward the center of the sealing body through hole 7552 from a surface of the sealing body 751 defining the sealing body through hole 752. The third contact protrusion 758 may extend to the second cut surface 754 from the first cut surface 753 to be connected to the second contact protrusion 757.

Hereinafter, an assembly process of the interface P described above will be described with reference to FIG. 13.

The first circuit substrate 4 in a state in which the encoder 5 and an encoder cover 6 are coupled to each other may be fixed to the case 41. An insulating material is applied to a surface of the first circuit board 4 fixed to the case 41.

The case 41 may be fixed to the cabinet 1 through the front panel 13, or may be fixed to the cabinet 1 through the panel support 12. When the case 41 is fixed to the front panel 13, the case 41 may be fixed to the front panel 13 through a bolt fixed to the second boss 412 to pass through the front panel 13, and the front panel 13 may be fixed to the panel support 12 through a bolt or the like.

When the front panel 13 is fixed to the panel support 12 and then the shaft 71 of the actuator 7 is inserted into the panel through hole 134 provided in the front panel, the shaft 71 may be fixed to the rotating body 521, and the fastening body 81*b* of the display unit may be fixed to the support body 511 of the encoder.

That is, when the shaft 71 is inserted into the panel through hole 134, the rotating body fastener 712 provided on the shaft is fixed to the shaft fastener 522, and the fixing body fastener 816 provided on the fastening body 81*b* may be fixed to the fastening body fixing portion 531 provided in the body through hole 514. Therefore, the actuator 7 is rotatably fixed to the first circuit board 4 through the rotating body 521, and the display unit 8 is fixed to the first circuit board 4 through the support body 511.

In this case, the wire 822 extended to the outside through the fastening body through hole 815 may be inserted into the cabinet 1 through the body through hole 514 provided in the encoder, the first boss through hole 413 provided in the case, and the wire through hole 123 provided in the panel support.

The interface P having the above-described structure may make the display 84 display a preset control command whenever a user turns the handle 73 (whenever the encoder generates an electrical signal) (search and change of control command).

When a desired control command is displayed on the display 84, the user may select the displayed control command through the selection unit 9, and the control command selected through the selection unit 9 may be initiated when the user inputs an execution command through the second input unit 47.

While the handle 73 is coupled to the first circuit board 4 to allow rotation motion, the housing 81 of the display unit is fixed to the first circuit board 4, and thus it is necessary to maintain an interval between the handle 73 and the housing 81. This is because, when the interval between the handle 73 and the housing 81 is not maintained, rotation of the handle 73 may be restrained.

To maintain the interval between the handle 73 and the housing 81, a spacer (protrusion) may be further provided on at least one of the circumferential surface of the accommodation body 81*a* or the accommodation space 731 provided in the handle.

FIG. 11 shows an example of a spacer. A spacer 814 of FIG. 11 may include a protrusion protruding toward the circumferential surface of the handle 73 from the circumferential surface of the accommodation body 81*a*. A free end of the spacer 814 may be provided in contact with the circumferential surface of the handle 73, or may be provided to prevent contact with the circumferential surface of the handle. The spacer 814 may include a plurality of protrusions that are spaced at intervals along the circumferential surface of the accommodation body 81*a*.

Unlike in the diagram, the spacer may also include a protrusion protruding toward the circumferential surface of the accommodation body 81*a* from the circumferential surface of the handle 73. In this case, the free end of the spacer may be provided in contact with the circumferential surface of the accommodation body 81*a* and may be provided not to contact the circumferential surface of the accommodation body 81*a*.

The laundry treatment apparatus described above is described in terms of a washing machine capable of washing clothing, but the interface may be applied to a dryer that dries the clothing. In this case, the tub 2 is omitted from the laundry treatment apparatus, and a drying unit configured to supply air to the drum 3 needs to be added.

The drying unit may include a supply flow path configured to supply air to the drum, a discharged flow path configured to discharge air inside the drum to the outside of the cabinet, a heater provided in the supply flow path and configured to heat air, and a fan provided in the discharge flow path. In contrast, the drying unit may include a circulation flow path configured to resupply air discharged from the drum to the drum, a heat exchanger (heat pump) provided inside the circulation flow path and configured to sequentially perform dehumidification and heating of air, and a fan provided inside the circulation flow path.

The configuration, control method, and assembly method of the aforementioned interface and laundry treatment apparatus are only for describing an example of the interface and laundry treatment apparatus, and thus the scope of the present disclosure is not limited to the aforementioned embodiments.

The invention claimed is:

1. An interface comprising:

an encoder including a fixing portion, a rotating portion rotatably coupled to the fixing portion, and a signal generator connected to a circuit board and configured to generate an electrical signal during rotation of the rotating portion;

an actuator including a shaft fixed to the rotating portion, a handle fixed to the shaft and configured to receive a force required for rotation of the shaft, and an accommodation space formed in the handle;

a display unit including a fastening body fixed to the fixing portion to pass through the shaft, an accommodation body fixed to the fastening body and located inside the accommodation space, a mounting space formed in the accommodation body, a fastening body through hole communicating with the mounting space to pass through the fastening body, an accommodation body through hole communicating with the mounting space to pass through the accommodation body, a display fixed to the accommodation body and configured to display information, a cover fixed to the accommodation body and configured to close the accommodation body through hole, and a wire inserted into the fastening body through hole and configured to transmit power or a signal to the display; and a sealing portion configured to block flowing of external air and water into the mounting space, wherein the sealing portion includes a fastening body sealing portion provided in the fastening body through hole to fix a position of the wire and configured to block flowing of water into the fastening body through hole.

2. The interface of claim 1, wherein the fastening body sealing portion includes:

a sealing body inserted into the fastening body through hole;

a sealing body through hole that is provided to pass through the sealing body and into which the wire is inserted; and a cut portion formed by cutting a circumferential surface of the sealing body to connect the circumferential surface of the sealing body to the sealing body through hole.

3. The interface of claim 2, wherein the sealing body includes a material with a greater elasticity than the fastening body, and a diameter of the sealing body is set to be greater than a diameter of the fastening body through hole.

4. The interface of claim 3, wherein a diameter of the sealing body through hole in a state in which the sealing body is inserted into the fastening body through hole is set to be less than a diameter of the wire.

5. The interface of claim 2, further comprising a first contact protrusion protruding toward the fastening body through hole from the circumferential surface of the sealing body and provided along the circumferential surface of the sealing body.

6. The interface of claim 5, wherein the cut portion includes a first cut surface directed toward a center of the sealing body through hole from the circumferential surface of the sealing body, a second cut surface directed toward a center of the sealing body through hole from the circumferential surface of the sealing body, and a cut groove formed between the first cut surface and the second cut surface, and the first contact protrusion extends to the second cut surface from the first cut surface along the circumferential surface of the sealing body.

7. The interface of claim 6, wherein an interval between the first cut surface and the second cut surface is set to a length for closing the cut groove when the sealing body is inserted into the fastening body through hole.

8. The interface of claim 7, further comprising a second contact protrusion protruding from at least one of the first cut surface and the second cut surface toward another one and extending toward the sealing body through hole from the circumferential surface of the sealing body.

9. The interface of claim 8, wherein the second contact protrusion is provided to connect the sealing body through hole and the first contact protrusion.

10. The interface of claim 9, further comprising a band-shaped third contact protrusion protruding toward a center of the sealing body through hole from the sealing body.

11. The interface of claim 1, wherein the sealing portion includes a cover sealing portion fixing the cover to the accommodation body to block flowing of external air and water into the mounting space through the accommodation body through hole.

12. The interface of claim 1, wherein the display is configured to display preset information according to the electrical signal generated by the signal generator.

13. The interface of claim 12, further comprising a selection unit provided in the mounting space and configured to determine whether to select a control command displayed on the display by detecting whether a body of a user is in contact with the cover.

14. The interface of claim 13, wherein the actuator further includes:

a shaft through hole provided to penetrate the shaft and to which the rotating portion is connected;

a disk-shaped base fixed to a circumferential surface of the shaft;

a plurality of base fasteners provided on the handle and fixed to the base; and a handle outlet provided to pass through the base or the handle and configured to guide water flowing into the accommodation space to an outside of the handle.

15. The interface of claim 14, further comprising:

a fastening guide provided on the handle and located between one base fastener and another base fastener; and a guide groove that is provided in a groove formed by bending a circumferential surface of the base toward the shaft through hole and in which the fastening guide is accommodated.

16. The interface of claim 15, wherein a depth of the guide groove is set to be greater than a height of the fastening guide, and the handle outlet is set to a hole formed between the guide groove and the fastening guide.

* * * * *